United States Patent Office 3,422,918
Patented Jan. 21, 1969

3,422,918
INDEPENDENT REAR WHEEL SUSPENSION
James G. Musser, Jr., Birmingham, and Benjamin F. Boehm, Oak Park, Mich., assignors to General Motors Corporation, Detroit, Mich., a corporation of Delaware
Filed May 24, 1967, Ser. No. 640,922
U.S. Cl. 180—73       11 Claims
Int. Cl. B60k *17/32;* B60g *11/14*

ABSTRACT OF THE DISCLOSURE

A driven road wheel is rotatably mounted on a support member having vertically spaced portions universally pivotally connected to the outer ends of laterally extending upper and lower control arms mounted for swinging movement about spaced fixed axes. Progressive changes in steer angle during rising and falling movement of the wheel is accomplished by a laterally directed link extending between one of the arms and a portion of the support spaced longitudinally from the axis defined by the vertically spaced portions.

---

This invention relates to rear wheel suspension for vehicles and more particularly to an anti-squat, anti-lift independent suspension structure incorporating means for inducing and controlling progressive change in steer angle of the wheel responsive to roll deflection of the sprung mass of the vehicle.

In the design of a rear wheel suspension it is desirable to provide, in addition to the normal elastic suspension qualities, geometric characteristics enabling resistance to squatting of the rear portion of the vehicle during acceleration and lifting thereof during braking of the rear wheels. Similarly, it is usually desirable that the suspension exhibit geometric characteristics tending to introduce roll understeer during cornering or turning maneuvers.

In the past, the two enumerated qualities have generally been incompatible in that geometry effective to provide anti-lift and anti-squat forces tended to produce geometric oversteer, while geometric arrangements effective to provide roll understeer tended to increase the degree of squat or lift. In the present invention, however, these usually incompatible geometric qualities are not only successfully combined, but in addition the rate of change of steer angle is susceptible to significant variation from the usually normal linear function of wheel deflection, thus enabling predetermination of an optimum steer angle for each increment of roll inclination of a vehicle.

The foregoing and other objects, advantages and features of the invention will become more readily apparent as reference is had to the accompanying specification and drawings wherein.

Figure 1:
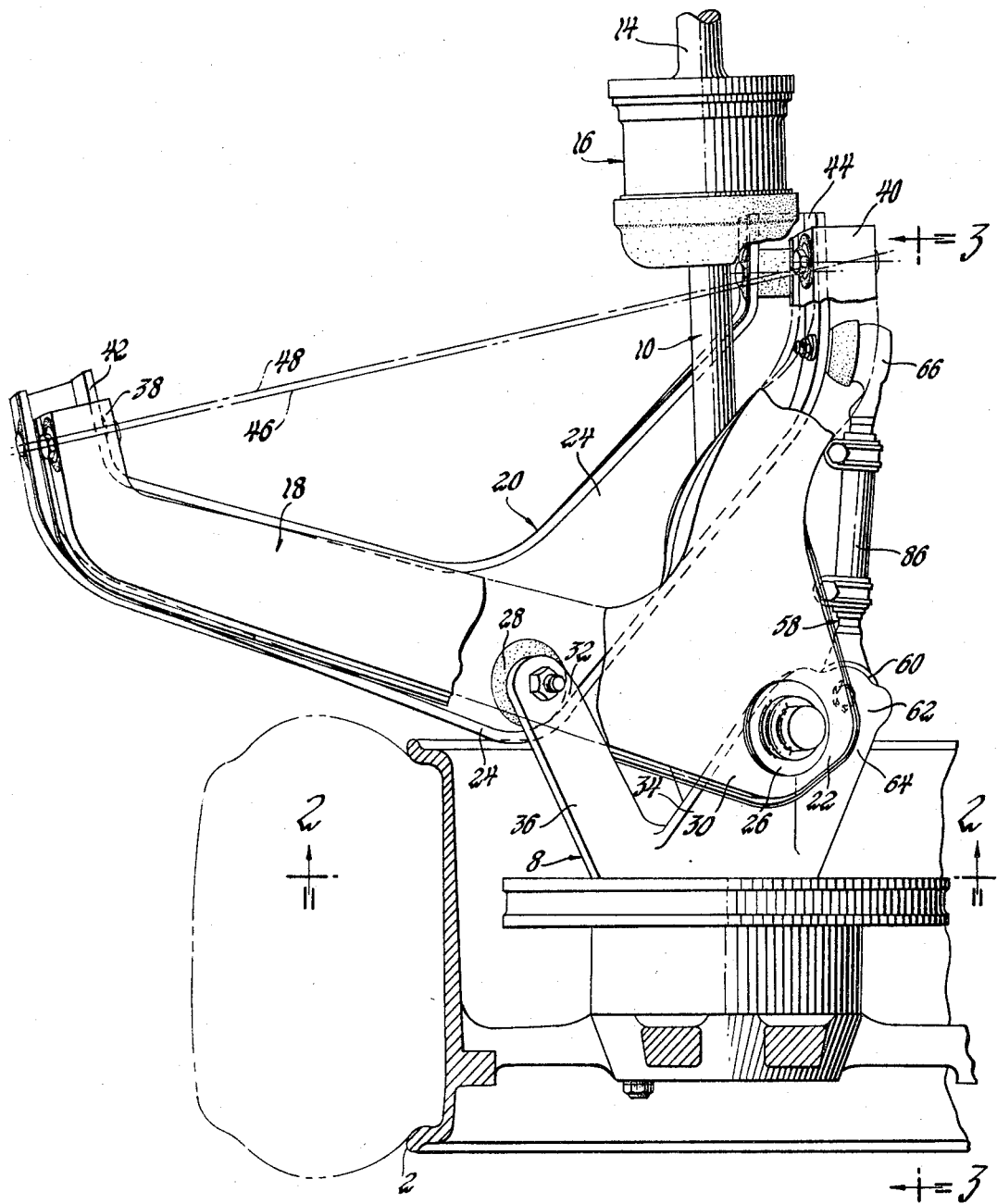
FIGURE 1 is a partial plan view of a portion of a vehicle suspension embodying the invention.

Referring now to the drawings, there is shown an independent suspension for the driven rear wheels of a vehicle in which the reference numeral 2 generally designates a driven road wheel which is mounted on a wheel spindle 4 rotatably supported concentrically within the hub portion 6 of a spindle support 8. Spindle 4 is operatively connected to the outboard end of a live axle 10 by means of a universal joint 12, while the inboard end of axle 10 is operatively connected to the output element 14 of a vehicle differential, not shown, by a conventional pot-type universal connection 16 which permits of limited axial and angular displacement of the live axle 10 relative to output member 14, while retaining driving engagement therewith. It will be understood that the opposite side of a vehicle is equipped with a corresponding road wheel and live axle assembly and that both wheels are suspended with reference to the sprung mass of the vehicle in the manner hereinafter described with reference to wheel 2.

In order to control the attitude and deflection path of wheel 2 relative to the sprung mass (not shown) in accordance with the invention, a pair of vertically spaced generally V-shaped upper and lower control arms 18 and 20 are arranged between the wheel and the sprung mass with their outboard ends 22 and 24 connected by means of ball joint type universal pivotal connections 26 and 28 to vertically spaced extremities 30 and 32 of limbs 34 and 36 formed on spindle support 8. The inboard ends 38–40 and 42–44 of upper and lower control arms 18 and 20 in turn are pivotally mounted in vertically spaced relation on the vehicle superstructure for vertical swinging movement about generally longitudinally extending axes 46 and 48 by means of non-aligned elastically buffered pin joints 50–52 and 54–56. The term "non-aligned" is used to denote a condition in which the axes of joints 52 and 56 intersects axes 46 and 48, respectively, in slightly skewed relation in order to maintain constant wheel toe-in relation under driving and braking loads.

According to one feature of the invention, both axes 46 and 48 slope downwardly toward the rear of the vehicle but with the sloping inclination of axis 48 being greater than that of axis 46 so that the respective axes converge forwardly of the vehicle at a point calculated to provide optimum resistance to acceleration squat and brake lift.

Figure 2:
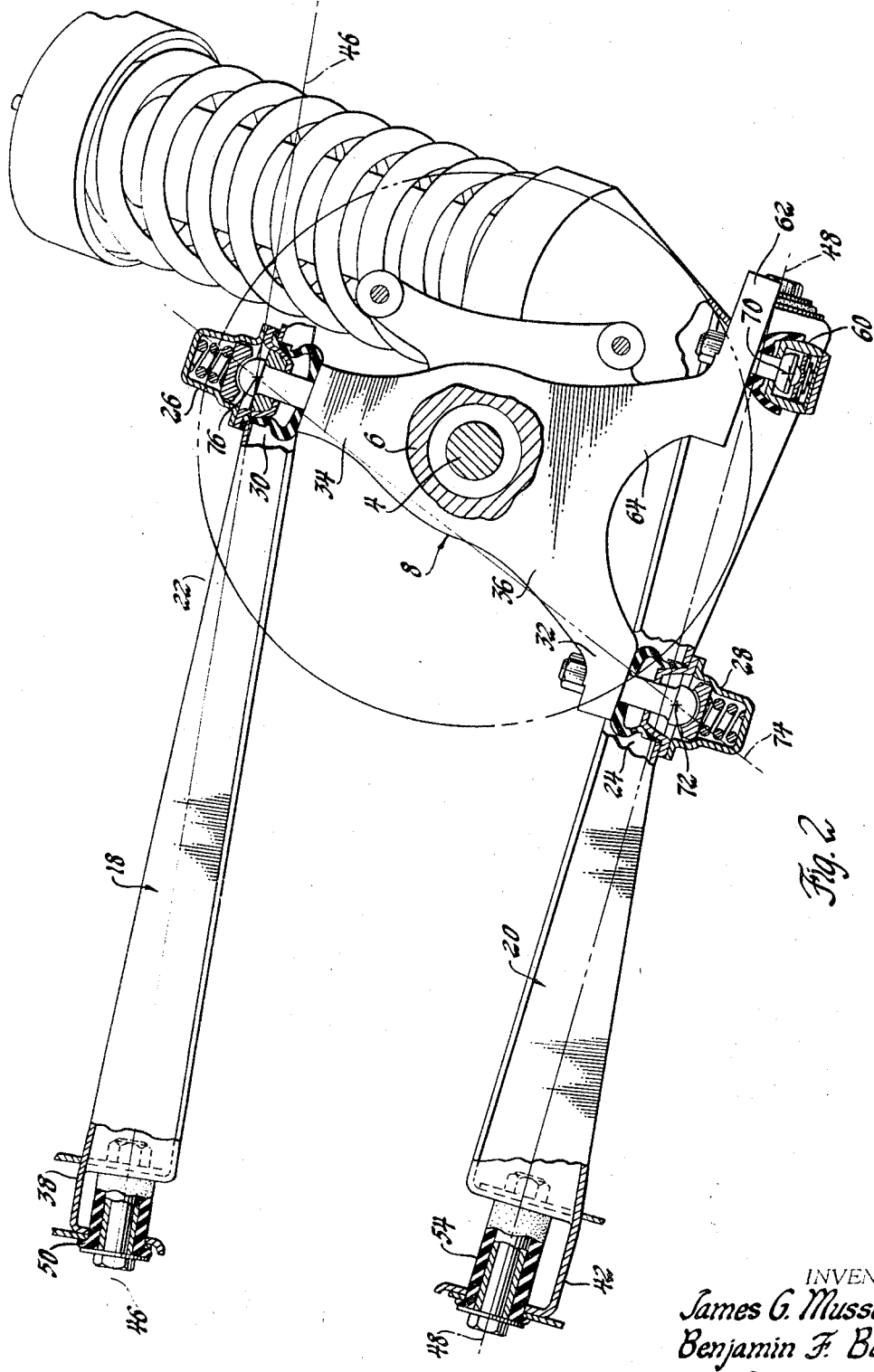
FIGURE 2 is a side elevational view, partly in section, of the construction shown in FIGURE 1.

According to another feature of the invention, an auxiliary link 58 is connected by a ball joint type universal pivotal connection 60 to the extremity 62 of a third limb 64 formed on spindle support 8. The inner end of link 58 in turn is connected by a ball joint type universal pivotal connection 66 to the rearwardly facing side wall 68 of the lower control arm 20 in radially spaced relation from the swing axis 48 thereof. As seen best in FIGURE 2, the geometric center 70 of universal pivotal connection 60 at the outer end of link 58 is located substantially below the swing axis 48 of arm 20 while the geometric center 72 of universal pivotal connection 28 is located in closer vertical proximity thereto. Consequently, upon initial upward deflection of wheel 2 relative to the sprung mass, universal pivotal connection 28 exhibits a very slight lateral outward component of movement, while the universal pivotal connection 60 exhibits a substantial lateral outward component of movement. The progressive change in relative lateral positions of the geometric centers 70 and 72 is imparted to wheel spindle support 8 causing the latter to be steered in the toe-in direction about imaginary axis 74 extending between geometric centers 76 and 72 of universal pivotal connections 26 and 28, respectively. Conversely, downward deflection of the wheel results in reversal of the lateral components of movement of universal pivotal connections 28 and 60 which causes change in the steer angle in the toe-out direction. Additionally, as seen best in FIGURE 3, the arc 78 generated from swing axis 48 passing through geometric center 72 reveals that universal pivotal connection 28 exhibits an outward component of movement during initial upward movement of wheel 2 only and thereafter moves progressively inwardly responsive to continued upward deflection of the wheel. However, the arc 80 generated from axis 48 and passing through the geometric center 70 reveals that universal pivotal connection 60 continues to exhibit an outward component of movement during an additional portion of upward deflection of the wheel after universal pivotal connection 28 has experienced transition from outward to inward movement. Consequently, the relative lateral displacements of universal pivotal connections 28 and 60 becomes more pronounced and, therefore, increase the degree of steer angle change in the toe-in direction. It will thus be seen that a construction according to the invention enables development of a steer angle change pattern which is a non-linear, but selectively determinable, function of wheel deflection.

Figure 3:
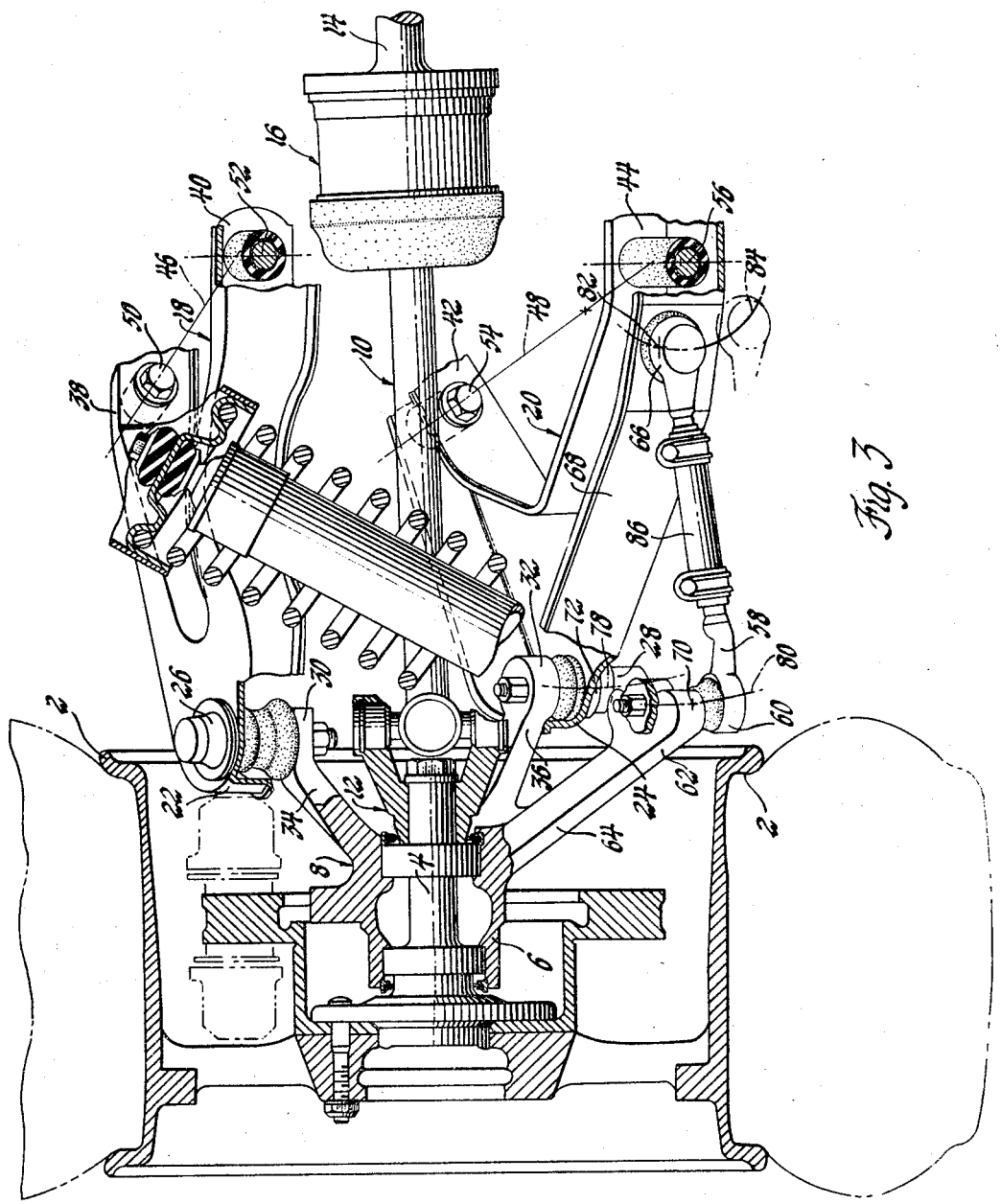
FIGURE 3 is a rear elevational view, partly in section, of the construction shown in FIGURES 1 and 2.

To further enhance the degree of control which may be exercised in establishing an optimum steer angle change pattern in accordance with the invention, as seen best in FIGURE 3, the geometric center 82 of inner pivotal connection 66 of link 58 is affixed to arm 20 in radially spaced relation from swing axis 48 at a point which tends to move laterally inwardly with upward deflection of arm 20. Thus, the geometric center 82 traverses a path along the arc 84 generated from the swing axis 48 and since it is initially located above a horizontal plane passing through the axis 48, each increment of upward movement of the arm causes the universal pivotal connection 66 to move both upwardly and inwardly at a rate which is differentially related to the upward and outward swinging movement of universal pivotal connection 60 relative to axis 48. In this manner, the precise steer angle of the wheel for any given increment of wheel deflection may be selectively altered and precisely controlled. While in the illustrated embodiment the geometric center 82 is located in a position producing a lateral inward component of movement coincident with a relative outward component of movement of the geometric center 70, the precise location of center 82 will, of course, vary both in terms of radial displacement from axis 48 and initial vertical location along arc 84 depending upon the steer angle characteristics desired relative to the handling and operating characteristics of the entire vehicle. Thus, although the illustrated location of universal pivotal connection 66 tends to attenuate the rate of increase in toe-in resulting from wheel deflection for certain increments of movement within the range of deflection, in practice, a neutralizing or accenting of rate of toe-in change for the corresponding increment of deflection may be indicated. In such instances, of course, the position of universal pivotal connection 66 would be appropriately oriented relative to axis 48. Thus, if it is desired to increase the rate of toe-in change in the illustrated embodiment, universal pivotal connection 66 would be relocated as for example to the position shown in dotted lines.

According to a further feature of the invention, link 58 includes a turn buckle assembly 86 enabling initial establishment of the steer angle of wheel 2 at vehicle design height.

In addition to the foregoing structural and geometric variables enabling exact tailoring of the desired rate of change of steer angle, the present construction also enables utilization of change in caster angle of spindle support 8 resulting from the diverging inclinations of axes 46 and 48 to control or exert a controlling influence on the rate of relative displacement of universal pivotal connections 28 and 60 occurring during upward deflection of the wheel. From reference to FIGURE 2, it will be evident that upward deflection of the wheel results in progressive counterclockwise movement of spindle support 8. Hence, for any given degree of upward deflection of the wheel, the rate of upward movement of universal pivotal connection 60 will be slightly greater than the rate of upward movement of universal pivotal connection 28. Consequently, the toe-in change resulting from upward wheel deflection will occur at a more rapid rate than would be the case if the wheel spindle support 8 exhibited no caster angle change.

From the foregoing it will be seen that three separate means for introducing and/or attenuating geometric roll understeer are provided, each of which is selectively susceptible to a wide range of geometric variation, either separately or cooperatively, thus enabling achievement of virtually any desired rate of change of steer angle through any given range of wheel deflection.

We claim:

1. In a motor vehicle, a driven road wheel rotatably mounted on a support, a pair of arms pivotally connected at their inner ends to said vehicle for swinging movement about vertically spaced fixed axes of motion, means universally pivotally connecting the outer ends of said arms in vertically spaced relation on said support, and a link universally pivotally connected at its opposite ends to one of said arms and said support respectively, the universal pivotal connections of said last mentioned arm and said link lying on an axis angularly related to the axis of motion of said arm so as to induce progressive change in steer angle responsive to rising and falling movement of said wheel.

2. The structure set forth in claim 1 wherein said axes of motion extend generally longitudinally of said vehicle and are inclined downwardly and rearwardly.

3. The structure set forth in claim 2 wherein said axes diverge rearwardly.

4. In a motor vehicle, a driven road wheel rotatably mounted on a support, a pair of arms pivotally connected at their inner ends to said motor vehicle for swinging movement about vertically spaced fixed axes of motion, means universally pivotally connecting the outer ends of said arms in vertically spaced relation on said support, and a link universally pivotally connected at its opposite ends to one of said arms and said support respectively, said universal pivotal connections being arranged relative to the axis of motion of said arm so as to describe differing arcuate paths responsive to swinging movement of said arm whereby the steer angle of said wheel changes progressively during rising and falling movement thereof.

5. The structure set forth in claim 4 wherein the universal pivotal connection of said link with said arm is offset radially from the axis of motion of said arm so as to describe an arcuate path about said axis during swinging movement of said arm dissimilar to the arcuate path described by the universal pivotal connection at the outer end thereof thereby causing a differential rate of change of steer angle during rising and falling movement of said wheel.

6. The structure set forth in claim 4 wherein said axes of motion are relatively inclined in a manner inducing change in caster angle whereby arcuate motion of said universal pivotal connection occurs partly responsive to swinging movement of said arm and partly responsive to angular movement of said support about the axis of said wheel so that the rate of change in steer angle during rising and falling movement of said wheel is non-linear.

7. The structure set forth in claim 5 wherein said universal pivotal connection of said link with said arm is offset radially in the direction of the universal pivotal connection at the outer end of said link.

8. The structure set forth in claim 7 wherein said universal pivotal connection is located above a line connecting the outer universal pivotal connection and the axis of motion of said arm.

9. The structure set forth in claim 8 including means for adjusting the length of said link.

10. In a motor vehicle, a frame, a support structure having a road wheel rotatably mounted thereon, upper and lower suspension control arms extending between said support and said frame, the inner ends of said arms being pivotally mounted on said frame for vertical swinging movement about vertically spaced rearwardly diverging axes, means universally pivotally connecting the outer ends of said arms to said support in vertically spaced relation, a link extending between one of said arms and said support, the inner end of said link being pivotally connected to said arm on an axis spaced from the axis of motion of said arm, and means universally pivotally connecting the outer end of said link to said support structure in rearwardly spaced relation to the universal pivotal connection of said arm with said support such that a line passing through the geometric centers of said universal pivotal connections forms a rearwardly diverging angle with the axis of motion of said arm.

11. In a motor vehicle, a road wheel support articulatably connected to said vehicle by spaced control arms having axes of motion effective to induce change in caster angle of said support during rising and falling movement thereof, and a link connected between one of said arms and said support at points thereon effective to utilize said caster angle change to impart progressive change in steer angle.

References Cited

UNITED STATES PATENTS

| | | | |
|---|---|---|---|
| 2,978,255 | 4/1961 | Rosenkrands | 267—20 |
| 3,163,440 | 12/1964 | Vail | 280—124 X |
| 3,189,118 | 6/1965 | Arning | 180—73 |
| 3,229,783 | 1/1966 | Muller | 180—73 |
| 3,257,121 | 6/1966 | Muller | 280/96.2 |

OTHER REFERENCES

KENNETH H. BETTS, *Primary Examiner.*

U.S. Cl. X.R.

267—20